(12) United States Patent
Lu

(10) Patent No.: US 7,995,338 B2
(45) Date of Patent: Aug. 9, 2011

(54) COVER LATCH MECHANISM AND ELECTRONIC DEVICE USING THE SAME

(75) Inventor: Pen-Uei Lu, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 175 days.

(21) Appl. No.: 12/430,985

(22) Filed: Apr. 28, 2009

(65) Prior Publication Data

US 2010/0123999 A1    May 20, 2010

(30) Foreign Application Priority Data

Nov. 20, 2008    (CN) .......................... 2008 1 0305670

(51) Int. Cl.
*H05K 7/14* (2006.01)
(52) U.S. Cl. .......... 361/679.58; 361/679.02; 292/DIG. 1
(58) Field of Classification Search ............. 361/679.01, 361/679.26, 724–727, 679.58, 679.02; 24/592.1; 403/353; 292/DIG. 38, DIG. 53, DIG. 11, DIG. 1

See application file for complete search history.

(56) References Cited

U.S. PATENT DOCUMENTS

| | | | |
|---|---|---|---|
| 7,495,899 B2 * | 2/2009 | Liu et al. ................. | 361/679.28 |
| 7,842,412 B2 * | 11/2010 | Zhang et al. ................. | 429/97 |
| 2007/0175840 A1 * | 8/2007 | Richter ...................... | 211/59.3 |

* cited by examiner

*Primary Examiner* — Jinhee Lee
*Assistant Examiner* — Ingrid Wright
(74) *Attorney, Agent, or Firm* — Steven M. Reiss

(57) ABSTRACT

A cover latch mechanism, used for fixing a first cover to a second cover, includes a latching groove defined in the second cover; a latching hook extending from a surface of the first cover corresponding to the latching groove, the latching hook engaged with the latching groove; and a connecting member fixed to the second cover. The connecting member includes a latching portion according to the latching hook. The latching portion defines a receiving depression to receive the latching hook, and an elastic resisting protrusion extending from the latching portion adjacent to the receiving depression to resist the latching hook in the latching groove.

15 Claims, 6 Drawing Sheets

COVER LATCH MECHANISM AND ELECTRONIC DEVICE USING THE SAME

BACKGROUND

1. Technical Field

The present disclosure relates to cover latch mechanisms used in electronic devices.

2. Description of the Related Art

Portable electronic devices usually include latch mechanisms to latch covers (such as battery covers) to housings. A cover latch mechanism usually includes hooks on the cover and grooves in the housing. The hooks can be hooked into the grooves, thus latching the cover to the housing. However, the hooks and the grooves of the housing are usually made of rigid plastic materials. When assembling, the hooks are interferingly fixed into the grooves. When disassembling, the hooks need to be drawn out from the grooves with a large external force. Thus, the hooks may easily be damaged in the grooves, and it is very difficult to remove damaged hooks from the grooves.

Therefore, there is room for improvement within the art.

BRIEF DESCRIPTION OF THE DRAWINGS

Many aspects of the present cover latch mechanism and an electronic device using the same can be better understood with reference to the following drawings. The components in the drawings are not necessarily drawn to scale, the emphasis instead being placed upon clearly illustrating the principles of the present electronic device. Moreover, in the drawings, like reference numerals designate corresponding parts throughout the several views.

DETAILED DESCRIPTION

Figure 1:
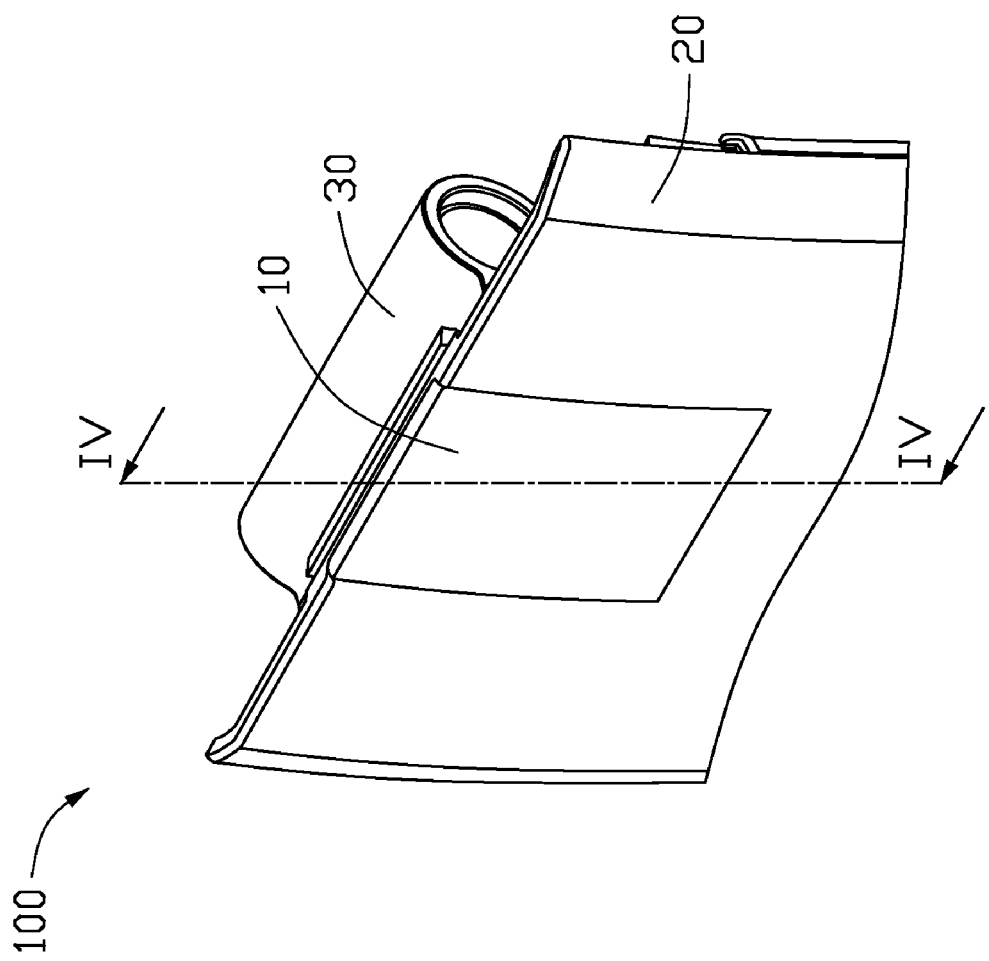
FIG. 1 is a partial, isometric view of an embodiment of an electronic device including a first cover, a second cover, a housing, and a cover latch mechanism.
Figure 2:
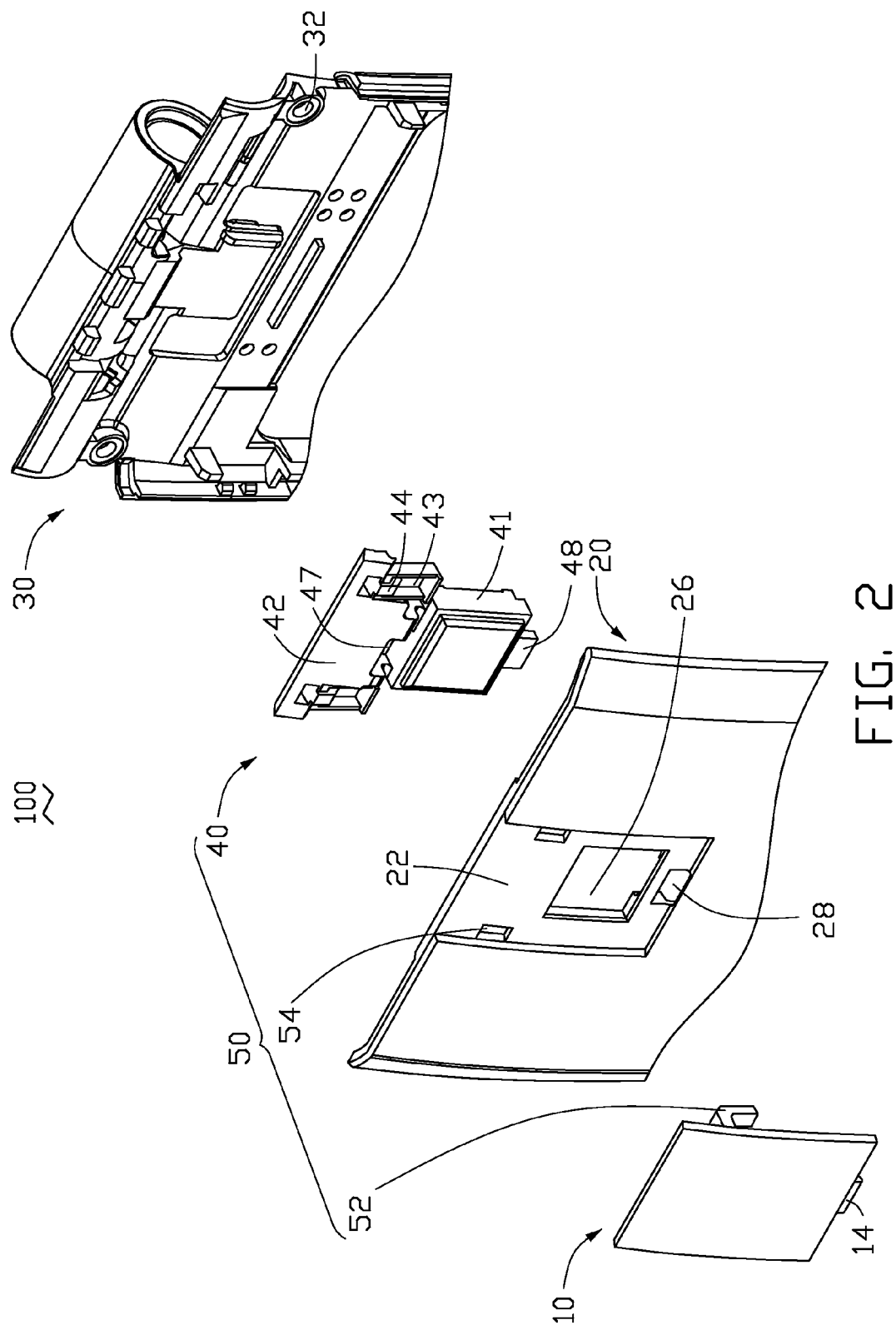
FIG. 2 is an exploded, isometric view of the electronic device shown in FIG. 1.
Figure 3:
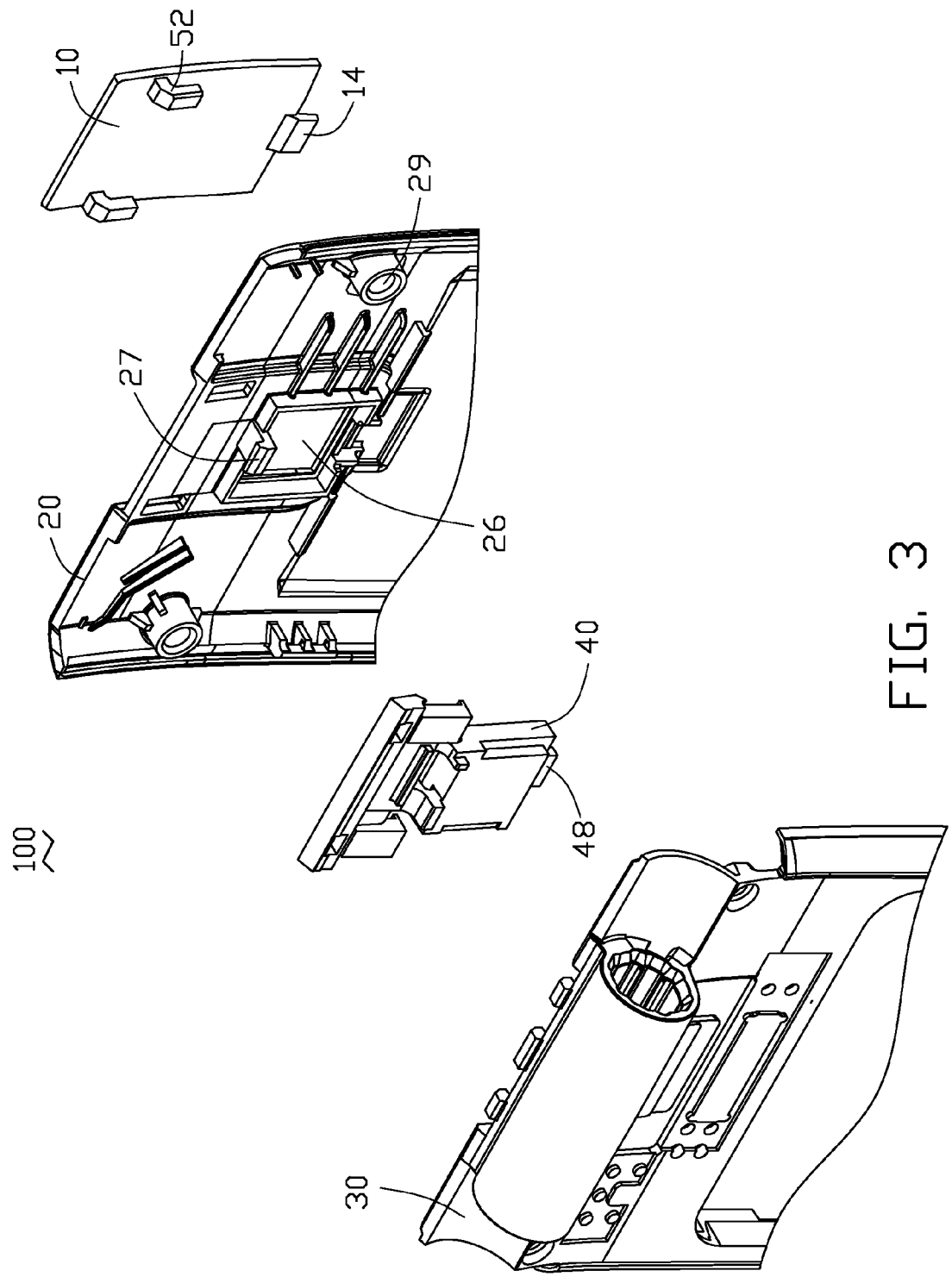
FIG. 3 is similar to FIG. 2, but viewed from another aspect.

Referring to FIGS. 1 through 3, an embodiment of an electronic device 100 includes a first cover 10, a second cover 20, a housing 30, and a cover latching mechanism 50. The second cover 20 is fixed to the housing 30. The first cover 10 is fixed on the second cover 20 by the cover latching mechanism 50. The electronic device 100 may be a mobile phone or a personal digital assistant (PDA), for example. In the illustrated embodiment, the electronic device 100 is a mobile phone.

Referring to FIGS. 2 and 3 again, the second cover 20 is substantially plate-shaped. The second cover 20 includes a rectangular depression 22, a mounting hole 26, a positioning hole 28, and a plurality of screw columns 29. The rectangular depression 22 is defined in a surface of the second cover 20 to receive the first cover 10. The positioning hole 28 is defined at a bottom edge of the rectangular depression 22. The mounting hole 26 is defined in the rectangular depression 22 adjacent to the positioning hole 28.

The first cover 10 is a rectangular sheet according to the size of the rectangular depression 22. The first cover 10 includes a positioning pin 14 extending from a side surface of the first cover 10.

The cover latching mechanism 50 includes a pair of latching hooks 52, a pair of latching grooves 54, and a connecting member 40. The pair of latching grooves 54 is defined in the rectangular depression 22 of the second cover 20 away from the positioning hole 28. The pair of latching grooves 54 are opposite to each other at opposite edges of the rectangular depression 22. The pair of the latching hooks 52 is defined at a surface of the first cover 10, and faces the pair of latching grooves 54, correspondingly.

The connecting member 40 includes a fixing portion 41, a latching portion 42 and a resisting portion 48. The latching portion 42 is connected to an upper side of the fixing portion 41. The resisting portion 48 extends out from a bottom side of the fixing portion 41 opposite to the latching portion 42. The fixing portion 41 is plate-like shaped according to a shape of the mounting hole 26. The latching portion 42 includes a pair of receiving depressions 43 and a pair of elastic resisting protrusions 44. Each of the receiving depressions 43 is operate to receive the corresponding latching hook 52. Each of the elastic resisting protrusions 44 extends from an upper edge of each of the receiving depressions 43 and bends towards the fixing portion 41. The elastic resisting protrusions 44 are made of elastic materials, such as rubber or an elastic metallic sheet. In the illustrated embodiment, the elastic resisting protrusions 44 of connecting member 40 are made of rubber.

Figure 4:
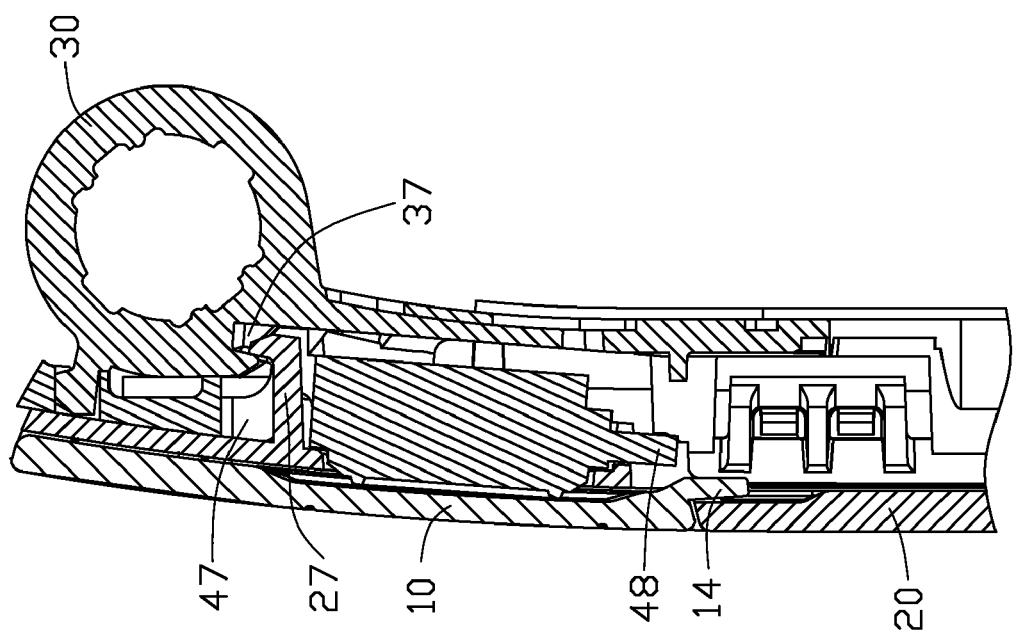
FIG. 4 is a side, cross-sectional view of the electronic device shown in FIG. 1 taken along line IV-IV.
Figure 5:
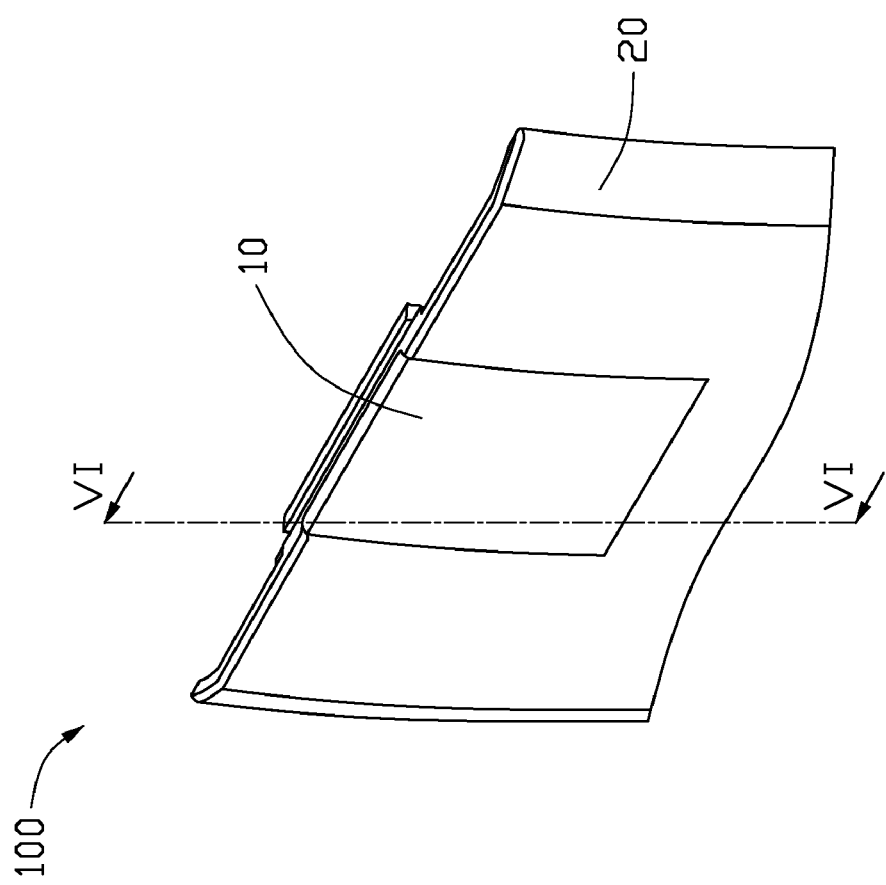
FIG. 5 is similar to FIG. 1, but without the housing.
Figure 6:
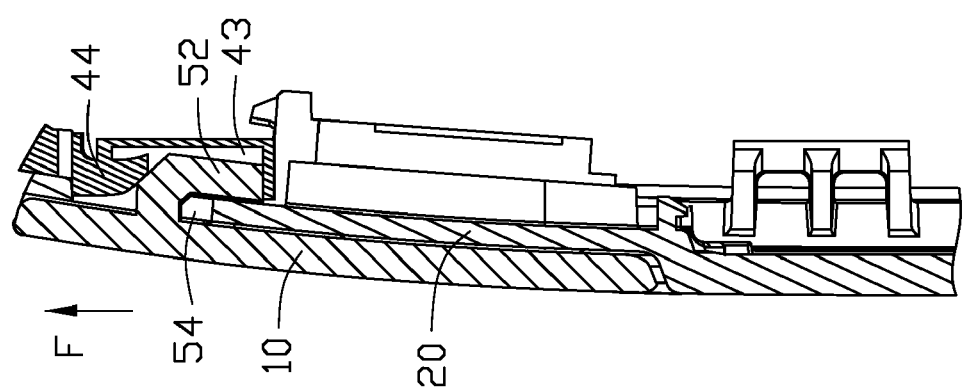
FIG. 6 is a side, cross-sectional view of the electronic device shown in FIG. 5 taken along line VI-VI.

Referring to FIGS. 4 and 6, in assembling, firstly, the positioning pin 14 of the first cover 10 is inserted into the positioning hole 28 of the second cover 20. Secondly, the latching hooks 52 of the cover latching mechanism 50 are engaged with the latching groove 54 corresponding, such that the first cover 10 is fixed to the second cover 20 tightly. Finally, the fixing portion 41 of the connecting member 40 is pressed into the mounting hole 26 of the second cover 20 until the receiving depression 43 receives the latching hook 52 and the elastic resisting protrusions 44 resist the corresponding latching hooks 52 in the latching groove 54. The resisting portion 48 of the connecting member 40 resists the housing 30.

Referring to FIG. 6 again, in disassembling, the latching hook 52 is pressed toward the elastic resisting protrusions 44, such that the elastic resisting protrusions 44 are in an elastically deformed state. Thus, the first cover 10 can be easily drawn out from the latching groove 54 of the second cover 20 along a direction F. In addition, the latching hooks 52 are not interferingly fixed into the latching grooves 54. Therefore, the latching hooks 52 are not easily damaged when assembling or in disassembling. Even if the latching hooks 52 becomes damaged, the damaged latching hooks 52 can be picked up from the receiving depressions 43.

The housing 30 defines a plurality of screwed holes 32 according to the screw columns 29 of the second cover 20. The second cover 20 with the first cover 10 is fixed to the housing 30 via screws (not shown) that are screwed through the screw columns 29 and the screwed holes 32.

Referring to FIGS. 2 through 4 again, in the illustrated embodiment, the connecting member 40 may further define a through hole 47 between the fixing portion 41 and the latching portion 42. The second cover 20 may further include a hook 27 formed at a surface of the second cover 20 opposite to the rectangular depression 22 and adjacent to the latching grooves 54. The housing 30 may include a mounting depression 37 according to the hook 27. The hook 27 of the second cover 20 can be engaged into the mounting depression 37 of the housing 30, such that the hook 27 passes through the through hole 47 of the connecting member 40.

In an alternative embodiment, it is to be understood that mounting hole 26 of the rectangular depression 22 of the second cover 20 can be replaced by a mounting protrusion. The mounting protrusion extends out from a surface of the rectangular depression 22 towards the fixing portion 41 of the connecting member 40. Correspondingly, the fixing portion 41 defines a mounting hole to receive the mounting protrusion.

In alternative embodiments, it is to be understood that, the receiving depression 43 may be a through hole as long as the receiving depression 43 can receive the damaged latching hooks 52, for example, the latching portion further includes a plurality of blocking members extending from a sidewall of the through hole for blocking the damaged latching hook.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A cover latch mechanism, used for fixing a first cover to a second cover, the second cover including a depression to receive the first cover, the cover latch mechanism comprising:
   a mounting hole defined in the depression,
   a latching groove defined in the second cover;
   a latching hook extending from a surface of the first cover corresponding to the latching groove, the latching hook engaged with the latching groove; and
   a connecting member fixed to the second cover, wherein the connecting member comprises a latching portion according to the latching hook and a fixing portion connected to the latching portion, the latching portion comprising a receiving depression defined therein to receive the latching hook, the fixing portion of the connecting member is engaged in the mounting hole, and an elastic resisting protrusion extending from the latching portion adjacent to the receiving depression to resist the latching hook in the latching groove.

2. The cover latch mechanism of claim 1, wherein the first cover comprises a positioning pin extending from a side surface thereof opposite to the latching hook, the second cover further comprises a positioning hole defined at a bottom edge of the depression, and the positioning pin of the first cover is inserted into the positioning hole of the second cover.

3. The cover latch mechanism of claim 1, wherein the connecting member further comprises a resisting portion extends out from a bottom side of the fixing portion opposite to the latching portion, and the elastic resisting protrusion extending from the latching portion and bending towards the resisting portion.

4. The cover latch mechanism of claim 1, wherein the elastic resisting protrusion is made of rubber, or an elastic metallic sheet.

5. An electronic device, comprising:
   a housing;
   a first cover;
   a second cover fixed to the housing; and
   a cover latch mechanism fixed the first cover to the second cover, the cover latch mechanism comprising: a latching groove defined in the second cover, a latching hook extending from a surface of the first cover corresponding to the latching groove, the latching hook engaged with the latching groove, and a connecting member fixed to the second cover, the connecting member including a latching portion according to the latching hook, the latching portion including a receiving depression, the receiving depression covering the latching hook and holding the latching hook when the latching hook drops from the first cover, and an elastic resisting protrusion extending from the latching portion adjacent to the receiving depression to resist the latching hook in the latching groove.

6. The electronic device of claim 5, wherein the second cover comprises a depression to receive the first cover.

7. The electronic device of claim 6, wherein the connecting member further comprises a fixing portion connected to the latching portion, the second cover defines a mounting hole in the depression thereof, and the fixing portion of the connecting member is engaged in the mounting hole.

8. The electronic device of claim 7, wherein the connecting member further comprises a resisting portion extends out from a bottom side of the fixing portion opposite to the latching portion, and the elastic resisting protrusion extending from the latching portion and bending towards the resisting portion.

9. The electronic device of claim 6, wherein the first cover comprises a positioning pin extending from a side surface thereof opposite to the latching hook, the second cover further comprises a positioning hole defined at a bottom edge of the depression, and the positioning pin of the first cover is inserted into the positioning hole of the second cover.

10. The electronic device of claim 6, wherein the connecting member further comprises a fixing portion connected to the latching portion, the fixing portion defining a mounting hole; the second cover further comprises a mounting protrusion extending out from a surface thereof, and received in the mounting hole.

11. The electronic device of claim 10, wherein the connecting member further defines a through hole between the fixing portion and the latching portion; the second cover further comprises a hook formed at a surface of the second cover opposite to the depression and adjacent to the latching grooves, the housing further comprises a mounting depression according to the hook, of the second cover, and the hook of the second cover is engaged into the mounting and the hook is engaged into the mounting depression of the housing and passes through the through hole of the connecting member.

12. The electronic device of claim 5, wherein the elastic resisting protrusion is made of rubber, or an elastic metallic sheet.

13. The electronic device of claim 5, wherein the second cover further comprises a plurality of screw columns, and the housing further defines a plurality of screwed holes according to the screw columns, the second cover is fixed to the housing via a plurality of screws screwed through the screw columns and the screwed holes.

14. A cover latch mechanism, used for fixing a first cover to a second cover, the second cover including a depression to receive the first cover, the cover latch mechanism comprising:
   a latching groove defined in the depression;
   a latching hook extending from the first cover, the latching hook extend through the latching groove; and
   a connecting member fixed to the second cover, the connecting member including a latching portion, the latching portion comprising a receiving depression defined therein to cover the latching hook, and an elastic resisting protrusion extending from the latching portion adjacent to the receiving depression to push the latching hook to hook the depression.

15. The cover latch mechanism of claim 14, wherein the connecting member further comprises a fixing portion connected to the latching portion, the fixing portion defining a mounting hole; the second cover further comprises a mounting protrusion extending out from a surface thereof, and received in the mounting hole.

* * * * *